US005570813A

United States Patent [19]
Clark, II

[11] Patent Number: 5,570,813
[45] Date of Patent: Nov. 5, 1996

[54] VISCOUS MATERIAL DELIVERY AND MANAGEMENT SYSTEM AND METHOD

[75] Inventor: James E. Clark, II, Ojai, Calif.

[73] Assignee: C.H. & I. Technologies, Inc., Santa Paula, Calif.

[21] Appl. No.: 447,071

[22] Filed: May 22, 1995

Related U.S. Application Data

[63] Continuation of Ser. No. 129,952, Sep. 30, 1993, abandoned.

[51] Int. Cl.$^6$ ..................................................... G01F 11/00
[52] U.S. Cl. ............................. 222/1; 222/394; 222/399
[58] Field of Search ............................... 222/394, 399, 222/402.1, 1

[56] References Cited

U.S. PATENT DOCUMENTS

| | | | |
|---|---|---|---|
| 2,261,834 | 11/1941 | Morgan | 222/399 X |
| 2,968,441 | 1/1961 | Holcomb | 222/402.1 X |
| 3,221,931 | 12/1965 | Porter | 222/399 X |
| 3,261,507 | 7/1966 | Cornelius | 222/399 X |
| 3,395,833 | 8/1968 | Rice, Jr. | 222/399 X |
| 4,174,811 | 11/1979 | Binder et al. | 222/399 X |
| 4,310,108 | 1/1982 | Motoyama et al. | 222/399 X |
| 4,706,847 | 11/1987 | Sankey et al. | 222/399 X |
| 4,887,651 | 12/1989 | Santiago | 222/399 X |
| 5,100,031 | 3/1992 | Verborg et al. | 222/399 X |
| 5,366,309 | 11/1994 | Springall | 222/399 X |
| 5,368,207 | 11/1994 | Cruysberghs | 222/399 X |

FOREIGN PATENT DOCUMENTS 2090919  7/1982  United Kingdom ................... 222/399

*Primary Examiner*—Joseph Kaufman
*Attorney, Agent, or Firm*—Drucker & Sommers

[57] ABSTRACT

A viscous material delivery and management system for delivery of a particular viscous material to a viscous material utilizing destination. The system has a sealed container for containment of a particular viscous material, a source of inert gas in gaseous communication with the sealed container, and a viscous material conduit in communication with the sealed container for delivery of the particular viscous material. The inert gas provides the motive force to move the particular viscous fluid from the sealed container to the viscous material utilizing destination.

8 Claims, 1 Drawing Sheet

5,570,813

VISCOUS MATERIAL DELIVERY AND MANAGEMENT SYSTEM AND METHOD

This application is a continuation of application Ser. No. 08/129,952, filed Sep. 30, 1993, now abandoned.

BACKGROUND OF THE INVENTION

1. Field of the Invention

This invention relates to the field of the delivery and management of viscous materials such as fluids, gels, pastes and semi-solid materials, and the like, and more particularly, to a method and device for delivering, by use of pressurized inert gas, these viscous materials from containers and sealed systems to an intermediate or an end destination, such as vehicles, machinery, and industrial and manufacturing process. This system and method preserves the purity and quality of the viscous materials, and moves substantially all of the viscous materials out of the containers and sealed systems so that the containers and sealed systems require less or no cleaning before they can be reused.

2. Description of the Prior Art

Vehicles, machinery, and industrial and manufacturing processes rely on a wide range of different viscous materials, including thick greases, gels, pastes and semi-solid material as manufacturing fuel stocks, ingredients, inputs and lubricants, and billions upon billions of pounds of these various viscous materials are utilized every year around the world. Applicant's use of the term "viscous materials," is meant to encompass materials which are not easily flowable.

Unlike the case of easily flowable and deliverable fluids, the delivery and management of these viscous materials and the disposal, cleaning of and/or recycling of their storage containers and delivery systems is troublesome and sometimes is a major expense, especially where the viscous materials are potentially harmful if dumped, such as in the case of industrial lubricants. Where the viscous materials are subject to drying out and oxidation, this may not only change and damage the qualities of the viscous material (i.e. food products, vitamins, nutrients and many cosmetic products are highly sensitive to oxidation, contamination, and drying out), but also makes it more difficult to transfer these viscous materials between different points within a system and remove them from the containers or delivery means. Many viscous materials tend to adhere to and harden on the inner surfaces of their containers and delivery means, and thereafter must be scrapped therefrom. Of course, doing so will generally result in the remaining viscous materials being exposed to further oxidation and/or contamination. In the past, elevated air pressure and/or temperature and/or mechanical means were utilized to transfer viscous materials between various points. However, this often is undesirable, as many viscous materials are subject to heat degradation and oxidation.

There accordingly remains a need for a method and system for delivering viscous materials in a manner which prevents them from drying out and oxidizing and which also aids in delivering more of the viscous materials from their containers and delivery systems.

SUMMARY OF THE INVENTION

The viscous material delivery and management system herein set forth eliminates substantially, or entirely, the cleaning of containers and delivery means by ensuring that most, if not substantially all of the viscous material contents are moved from the sealed containers and delivery means by the motive force of pressurized inert gas, such as nitrogen. The inert gas not only prevents drying out and oxidation of the viscous material, but is believed to act to prevent the viscous materials from sticking to the inner surfaces of their containers and delivery systems, which allows a greater amount of the viscous material to be removed. The Applicant's attempts to achieve the same desired results by use of compressed air, as opposed to an inert gas, were unsuccessful.

The management aspect of the invention arises out of the ease with the viscous materials may be transferred and delivered to various points.

DETAILED DESCRIPTION OF THE INVENTION

Figure 1:
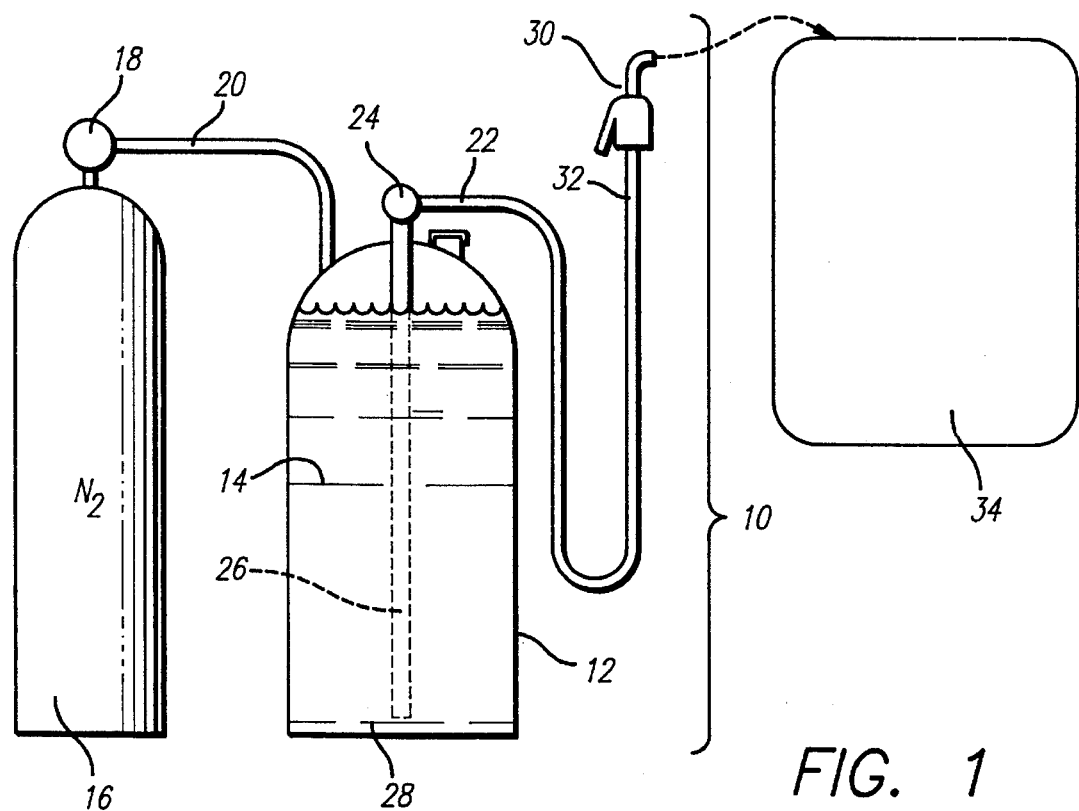
FIG. 1 shows, in a schematic form, a first embodiment of the viscous material delivery device of the invention.

Referring generally to FIG. 1, a first embodiment of a viscous material delivery device 10 is shown. The device has a sealed and pressurizable viscous material container 12, which contains viscous material 14 (i.e. such as lubricating grease). An inert gas supply 16, such as provided by cylinders of nitrogen or other inert gases fitted with a pressure regulator and valve 18, is connected via a hose or pipe 20 to the viscous material container 12. The inert gas will thus exert gaseous pressure on the viscous material 14. A viscous material delivery conduit 22 is connected to the viscous material container 12 through a valve 24. A viscous material feed tube 26 extends from the valve 24 down into the container 12 to near its bottom 28. A nozzle and valve 30 on the free end 32 of the viscous material delivery conduit 22 is used to deliver, on demand, the viscous material 14 from the viscous material container 12 to a viscous material utilizing destination 34. The destination 34 can be a vehicle, a machine, or an industrial or manufacturing process. A refilling port 36 is also provided to refill the container 12 as the need arises.

The pressurized inert gas routed via the hose or pipe 20 to the viscous material container 12 will provide the motive force to move the viscous material 14 out of the viscous material container 12, and leave substantially none behind. The Applicant has found that nitrogen pressure in the range of 15 to 120 pounds per square inch functions well for most viscous materials. Each viscous material containers 12 will be dedicated to contain just one particular viscous material 14, and no other, and can be identified with visual indicia (not shown) to identify it as dedicated to that particular viscous material 14. A plurality of such viscous fluid continuous 14 can be provided, to contain a number of particular viscous materials (not shown).

Figure 2:
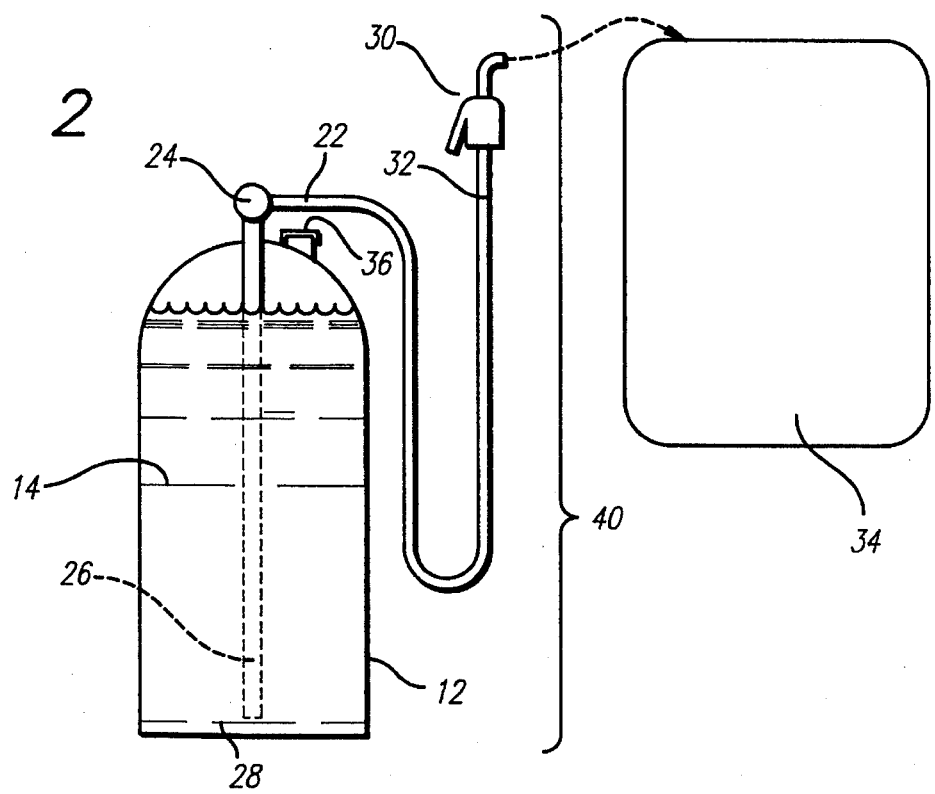
FIG. 2 shows, in a schematic form, a second embodiment of the viscous material delivery device of the invention.

Referring to FIG. 2, a second embodiment 40 of the viscous material delivery system of the invention is shown. This system 40 is otherwise identical to the system 10 shown in FIG. 1 and described above, except that it does not utilize an exterior cylinder of insert gas to provide a constant source of pressure inert gas. (Where practical, applicant uses the same reference numerals to describe the same feature of both embodiments.) In the embodiment of FIG. 2, the inert gas is directly stored in the sealed and pressurized viscous material containers 12. The amount of pressurized inert gas is selected to effectively deliver the particular viscous material to be delivered. The second embodiment of FIG. 2 is ideal for portable systems, wherein only relatively small amounts of viscous materials need be delivered. On the other hand, the system of FIG. 1 is well-suited to applications wherein relatively large amounts of viscous materials need to be delivered, and from a relatively large viscous fluid container 12, such as in industrial and manufacturing settings.

As an example of the efficacy of the instant device and method as compared to prior art systems and methods, the applicant refers to the case where the viscous material is vehicle lubricating grease. Vehicle lubricating grease is typically provided to automobile service stations and repair facilities in either bulk drums (which once opened up, no longer prevent the grease inside from oxidizing and drying out), or relatively small and disposable tubes or canisters which fit into the grease gun. Although these tubes or canisters are more expensive, for reasons described below, many mechanics prefer to use these more expensive tubes or canisters.

When bulk drum vehicle lubricating grease is used, the mechanic must fill his or her relatively small capacity grease gun with grease by manually pushing the grease out of the drum (by mechanical means which may include a follower plate) and into the grease gun. These prior art systems are not sealed systems, and with time, the grease tends to dry up and hardened in the drums, and can be contaminated with air borne dust, dirt and the like. About 30 to 40 percent of the grease is typically left behind in these bulk drums which do not use follower plates, and about 10 percent is left behind in the systems using follower plates. The longer the grease remains in the grease drum, the harder and more dried out it becomes. The mechanic has two options. First, he or she can open up the drum, remove the follower plate (if present) and other grease pumping equipment and then manually scrape out the remaining grease. This is inconvenient and can be extremely dirty work. Moreover, this increases the possibility that even more dust, dirt and other contaminants will find their way into the grease, rendering it unusable. Typically, this leftover grease will be used for low value purposes, such as greasing the fifth wheels (a coupling point where a trailer and tractor hitch together).

Many mechanics take a second option, and opt to let others deal with the remaining grease in the drums, by turning the drums over to drum reconditioners, who basically do what the mechanic avoids doing, and also stream and/or acid clean the drums. This costs a lot of money, and creates its own adverse environmental consequences. While the situation regarding disposable individual tube or canisters appears better, it too is undesirable because of the higher costs. Moreover, since a considerable amount of unused grease remains in these disposable tubes or canisters when they are thrown away, the remaining grease ends up in landfills and dumps, which is extremely damaging to the environment.

In sharp contrast to the prior art methods, the applicant has found that by his method, much less of the grease is left behind in the sealed container 12. Moreover, since the system is sealed and remains contamination free, these containers 12 can be easily refilled and replenished with the identical grease without any intervening cleaning of the container. This saves the mechanic money and helps guard the environment. Another important advantage of the instant invention is that the delivered of the grease can be accomplished in a very controlled manner, and if desired, directly from the sealed container 12 to the vehicle.

As mentioned above, any number of viscous materials 14 can be delivered and managed by the system 10 of the invention. To mention just a few of the possible viscous materials which can be delivered by the instant method and device, food products, nutritional products, cosmetic and pharmacological ingredients and products, in the form or viscous liquids, gels, greasy solutions, can be delivered.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following claims:

I claim:

1. A method of delivering thick, viscous grease which tends to resist forces which would cause it to easily flow to a grease utilizing destination, comprising the following steps:

providing a sealed pressure container for containment of a thick, viscous grease;

providing a source of pressurized non-drying inert gas in gaseous communication with said sealed pressure container and the thick viscous grease contained therein; and providing a viscous grease conduit means in communication with said sealed pressure container for containment of the thick, viscous grease, wherein said pressurized inert gas, acting directly on the thick, viscous grease, without a pusher plate, provides the motive force to move the thick, viscous grease from said sealed pressure container to the viscous grease utilizing destination.

2. The method of delivering thick, viscous grease of claim 1, wherein said non-drying and inert gas is selected from the group consisting of nitrogen, helium, and argon, and is supplied to the sealed pressure container at a pressure of about 15 to 120 pounds per square inch.

3. The method of delivering thick, viscous grease of claim 1, wherein said source of pressurized non-drying inert gas is provided to said sealed pressure container from a separate sealed container of pressurized inert gas.

4. The method of delivering thick viscous grease of claim 1, wherein said source of pressurized non-drying inert gas is directly stored in said sealed container for containment of said particular thick, viscous grease.

5. A method of delivering a particular, thick, viscous material which tends to resist forces which would cause it to easily flow to a viscous material utilizing destination, comprising the following steps:

providing a sealed pressure container for containment of a particular thick, viscous material;

providing a source of pressurized non-drying inert gas in gaseous communication with said sealed pressure container and the thick, viscous material contained therein; and providing a viscous material conduit means in communication with said sealed pressure container for containment of the particular thick, viscous material, wherein said pressurized inert gas, acting directly on the thick, viscous material, without a pusher plate, provides the motive force to move the thick, viscous materials from said sealed container to the viscous material utilizing destination.

6. A method of delivering a thick, viscous material of claim 5, wherein said non-drying and inert gas is selected from the group consisting of nitrogen, helium, and argon, and is supplied to the sealed pressure container at a pressure of about 15 to 120 pounds per square inch.

7. The method of delivering a thick, viscous material of claim 5, wherein said source of pressurized non-drying inert gas is provided to said sealed pressure container from a separate sealed container of pressurized inert gas.

8. The method of delivering a thick, viscous material of claim 5, wherein said source of pressurized non-drying inert gas is directly stored in said sealed container for containment of said particular thick, viscous material.

\* \* \* \* \*